US012781988B2

(12) United States Patent
Dennehy Sosebee

(10) Patent No.: US 12,781,988 B2
(45) Date of Patent: Nov. 3, 2026

(54) MODULATING PREHEATING DEVICE FOR ENERGY RECOVERY VENTILATION SYSTEMS

(71) Applicant: Alliance for Energy Innovation, LLC, Golden, CO (US)

(72) Inventor: Conor J. Dennehy Sosebee, Fairbanks, AK (US)

(73) Assignee: Alliance for Energy Innovation, LLC, Golden, CO (US)

( * ) Notice: Subject to any disclaimer, the term of this patent is extended or adjusted under 35 U.S.C. 154(b) by 344 days.

(21) Appl. No.: 18/633,680

(22) Filed: Apr. 12, 2024

(65) Prior Publication Data

US 2024/0344733 A1 Oct. 17, 2024

Related U.S. Application Data

(60) Provisional application No. 63/495,812, filed on Apr. 13, 2023.

(51) Int. Cl.

| | |
|---|---|
| ***F24F 11/65*** | (2018.01) |
| ***F24F 7/08*** | (2006.01) |
| ***F24F 11/00*** | (2018.01) |
| ***F24F 110/12*** | (2018.01) |
| ***F24F 110/22*** | (2018.01) |
| ***G05D 23/19*** | (2006.01) |

(52) U.S. Cl.

CPC ................ *F24F 11/65* (2018.01); *F24F 7/08* (2013.01); *F24F 11/0001* (2013.01); *G05D 23/1951* (2013.01); *F24F 2011/0002* (2013.01); *F24F 2110/12* (2018.01); *F24F 2110/22* (2018.01); *F24F 2221/34* (2013.01)

(58) Field of Classification Search

CPC ............... F24F 2110/10; F24F 2110/20; F24F 11/0001; F24F 11/65; F24F 7/08; G05D 23/1951

USPC .......................................................... 454/239

See application file for complete search history.

(56) References Cited

U.S. PATENT DOCUMENTS

| | | | | |
|---|---|---|---|---|
| 6,606,874 | B1 | 8/2003 | Bühring et al. | |
| 11,391,474 | B2 | 7/2022 | Eplee | |
| 12,629,983 | B2 * | 5/2026 | Yin .................... | B60H 1/00785 |
| 2008/0108295 | A1 * | 5/2008 | Fischer ................. | F24F 3/1423 454/239 |

(Continued)

FOREIGN PATENT DOCUMENTS

| | | |
|---|---|---|
| WO | 2021/068996 A1 | 4/2021 |

OTHER PUBLICATIONS

International Search Report and Written Opinion for International (PCT) Application No. PCT/US24/24202, mail date Aug. 13, 2024, pp. 1-9.

(Continued)

*Primary Examiner* — Vivek K Shirsat
(74) *Attorney, Agent, or Firm* — Alexandra M Hall

(57) ABSTRACT

A modulating preheating device (MPD) for a building energy recovery ventilation (ERV) system which can modulate its heating based on the conditions of both the building return air and the intake air is described. The MPD is an add-on module for ERV units utilizing a heat exchanger core which can preheat intake air when necessary to reduce frost formation. The preheating can be modulated using a controller.

16 Claims, 3 Drawing Sheets

(56) References Cited

U.S. PATENT DOCUMENTS

| | | | | |
|---|---|---|---|---|
| 2011/0264273 | A1* | 10/2011 | Grabinger .......... | G05B 19/0428 236/51 |
| 2014/0048244 | A1 | 2/2014 | Wallace | |
| 2017/0016645 | A1 | 1/2017 | Maisotsenko et al. | |
| 2017/0115025 | A1 | 4/2017 | Mowris et al. | |
| 2017/0182861 | A1* | 6/2017 | Steinman ........... | B60H 1/00028 |
| 2022/0205659 | A1 | 6/2022 | Saunders et al. | |

OTHER PUBLICATIONS

"The BrHEAThe System—Mechanical Heating and Ventilation", Compiled by Cold Climate Housing Research Center, 2014, available at https://cchrcorg/media/brHEAThe-Manual.pdf, pp. 1-11.

"ComfoFond-L—Installer Manual", Zehnder, available at https://www.zehnderamerica.com/wp-content/uploads/2014/02/ComfoFond-L-Installation-Manual.pdf, accessed May 14, 2024, pp. 1-32.

"Packaged Make-Up Air", Electro Industries, available at https://electromn.com/wp-content/uploads/2020/04/EL911.pdf, accessed May 14, 2024, pp. 1-4.

"Ventilation system Zehnder ComfoAir Q—Manual for the installer", Zehnder America, Inc, available at https://www.zehnderamerica.com/wp-content/uploads/2021/03/ComfoAir_Q-Installer_Zehnder-America_EN_2021.03.22-1.pdf, accessed on May 14, 2024, pp. 1-19.

Stevens et al., "Providing Healthy Air and Efficient Heating for Rural Alaska Homes with the BrHEAThe System", Journal of Architectural Engineering, vol. 27, No. 1, pp. 05020011-1-05020011-10.

* cited by examiner

MODULATING PREHEATING DEVICE FOR ENERGY RECOVERY VENTILATION SYSTEMS

CROSS-REFERENCE TO RELATED APPLICATIONS

This application claims priority to U.S. Provisional Patent Application No. 63/495,812 filed on Apr. 13, 2023, the contents of which are incorporated herein by reference in their entirety.

CONTRACTUAL ORIGIN

This invention was made with United States government support under Contract No. DE-AC36-08GO28308 awarded by the U.S. Department of Energy. The United States government has certain rights in this invention.

BACKGROUND

Energy recovery ventilation (ERV) is most difficult at the coldest temperatures due to the potential for frost accumulation in the exhaust air. However, at these temperatures, there is also the greatest availability to transfer heat between air streams, due to the large temperature difference between the exhaust air and supply air. Frost limits the heat transfer and creates the potential for blockage of airflow. ERV systems typically prevent frost accumulation reactively through a defrost method, which stops "fresh" outside supply air from entering the building's ventilation system as the components warm back up. Preheaters that have a fixed output based on an outdoor set point (e.g., approximately 0 °C or 32 °F) exist, but they are associated with a large energy penalty due to the energy required to preheat the supply air and a reduction in recovery efficiency from the reduced temperature difference, especially in extreme cold climates with high utility costs. Thus, there remains a need for an energy efficient way to keep ERV systems operational in extremely cold temperatures.

SUMMARY

An aspect of the present disclosure is a method including calculating, using a controller, an estimated dewpoint of a building return air, measuring, using a first sensor, a first temperature of an intake air, measuring, using a second sensor, a second temperature of the building return air, determining, using the controller, whether the second temperature is greater than or less than the estimated dewpoint, activating, using the controller, the heating coil when the second temperature is determined to be less than the estimated dewpoint, in which the heating coil is in thermal communication with the intake air, and the activating includes emitting an amount of heat from the heating coil. In some embodiments, the method also includes measuring, using a third sensor, a third temperature of the intake air, in which the heating coil has a first side and a second side, the first sensor is on the first side, and the third sensor is on the second side. In some embodiments, the method also includes determining, using the controller, a target temperature for the intake air, adjusting the amount of heat emitted from the heating coil until the fourth temperature is approximately equivalent to the target temperature. In some embodiments, the method also includes determining, using the controller, whether a fourth temperature of the building return air in a heating recovery ventilator is greater than or less than the estimated dewpoint, and activating, using the controller, the heating coil when the fourth temperature is determined to be less than the estimated dewpoint, in which the building return air is configured to exchange heat with the intake air in the heating recovery ventilator. In some embodiments, the method also includes deactivating, using the controller, the heating coil when the fourth temperature is determined to be greater than the estimated dewpoint. In some embodiments, the method also includes deactivating, using the controller, the heating coil when the second temperature is determined to be greater than the estimated dewpoint. In some embodiments, the calculating includes taking a measurement of the building return air, communicating the measurement to the controller, and determining, based on the measurement, the estimated dewpoint, in which the measurement includes at least one of the temperature and the relative humidity of the building return air. In some embodiments, the measuring includes communicating the first temperature and the second temperature to the controller. In some embodiments, the heating recovery ventilator is a part of an energy recovery ventilation (ERV) system. In some embodiments, the heating coil is positioned within a housing. In some embodiments, a filter is positioned within the housing on the first side of the heating coil. In some embodiments, the heating coil includes an electric resistance coil or a hydronic heating coil.

An aspect of the present disclosure is a device including a housing connected to an intake, a heating coil positioned within the housing and having a first side and a second side, a first sensor positioned within the housing on the first side of the heating coil, a second sensor positioned within a building return, and a controller, in which the first sensor is configured to measure a first temperature of an intake air and to communicate the first temperature to the controller, the second sensor is configured to measure a second temperature of a building return air and to communicate the second temperature to the controller, the controller is configured to calculate an estimated dewpoint of the building return air, and the heating coil is configured to be activated when the second temperature is less than the estimated dewpoint. In some embodiments, the device also includes a third sensor positioned within the housing on the second side of the heating coil; in which the third sensor is configured to measure a third temperature of the intake air and to communicate the third temperature to the controller. In some embodiments, the controller is configured to determine a target intake air temperature which would correspond to a building return air temperature greater than the estimated dewpoint, and the controller is configured to modulate the heating coil, so the third temperature is approximately equivalent to the target intake air temperature. In some embodiments, the device also includes a filter positioned within the housing on the first side of the heating coil. In some embodiments, the controller is configured to deactivate the heating coil when the second temperature is greater than the estimated dewpoint. In some embodiments, the housing is substantially insulated. In some embodiments, the heating coil comprises an electric resistance coil or a hydronic heating coil. In some embodiments, the building return air is configured to exchange heat with the intake air in a heating recovery ventilator, the controller is configured to determine whether a fourth temperature of the building return air in the heating recovery ventilator is greater than or less than the estimated dewpoint, and the controller is configured to activate the heating coil when the fourth temperature is less than the estimated dewpoint.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1:
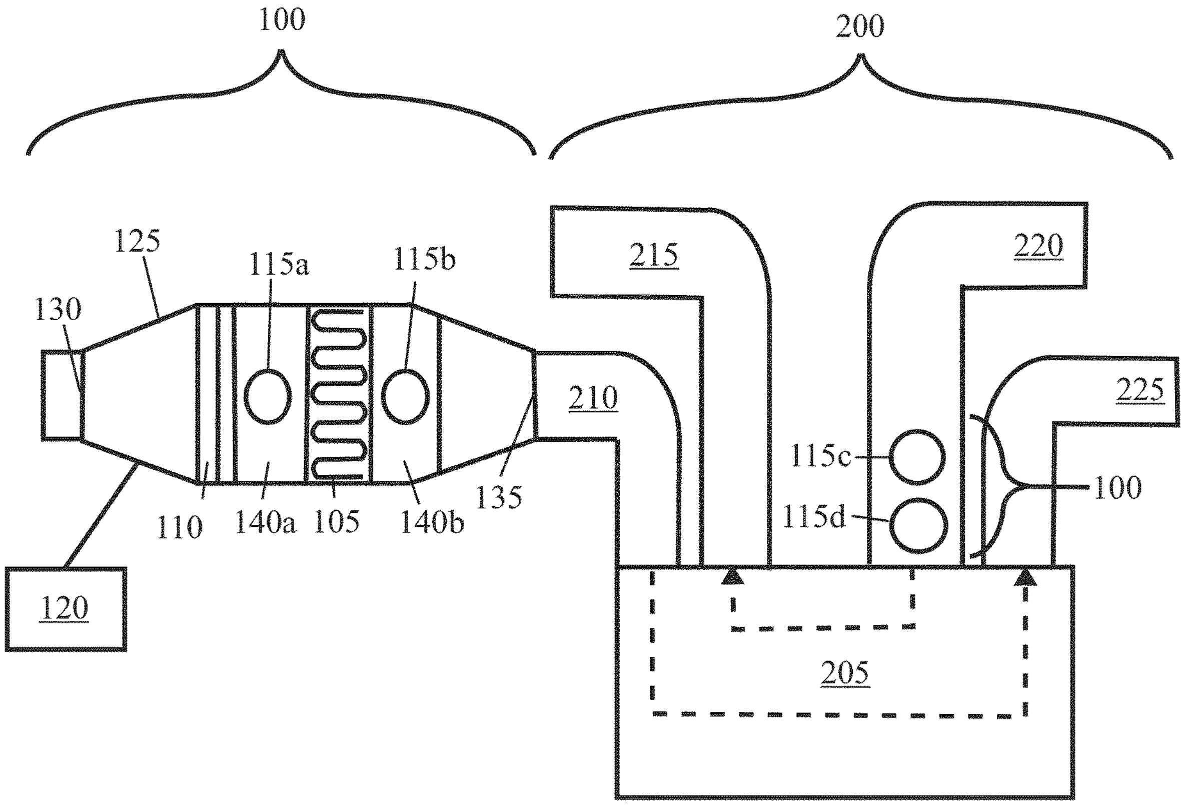
FIG. 1 illustrates a modulating preheating device (MPD) integrated with a heat recovery ventilator and system ducting, according to some aspects of the present disclosure.

100 . . . modulating preheating device (MPD)
105 . . . heating coil
110 . . . filter
115 . . . sensor
120 . . . controller
125 . . . housing
130 . . . inlet
135 . . . outlet
140 . . . gap
150 . . . insulative material
155 . . . metal skin
200 . . . energy recovery ventilation (ERV) system
205 . . . heat recovery ventilator (HRV)
210 . . . intake
215 . . . exhaust
220 . . . building return
225 . . . building supply
300 . . . method
305 . . . calculating
310 . . . measuring
315 . . . determining
320 . . . activating

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to a modulating preheating device (MPD) for a building energy recovery ventilation (ERV) system which can modulate its heating based on the conditions of both the building return air and the intake air. The MPD is an add-on module for ERV units utilizing a heat exchanger core which can selectively preheat intake air to reduce frost formation. In typical ERV systems operating in cold climates, frost formation blocks airflow, leading to reduced heat exchange and eventual system shutdown, thus frost prevention, as provided by the MPD, may allow for ventilation and unit functionality to be provided at temperatures below freezing. The preheating of the MPD can be modulated using a controller to the appropriate heat level (if any) to prevent frost formation.

Many ERVs have three primary operating statuses: an air exchange mode, a circulation mode, and an "off" or "stop operating" mode. The time spent in each operating status may depend on the desired internal building temperature, the outdoor temperature, and the efficiency of the heat recovery ventilator, among other things. Traditionally, at very low outdoor temperatures duc to frost build up on the components, the ERV may spend the majority of its time in an "off" mode in an attempt to defrost. By preheating the intake air at certain times, the MPD described herein may reduce the frost build up, enabling the ERV 200 to spend more time in the air exchange mode even in very low outdoor temperatures, which may improve the indoor air quality of the building.

FIG. 1 illustrates an MPD 100 integrated with an ERV 200, according to some aspects of the present disclosure. The MPD 100 may include a housing 125 connected to the intake 210 duct for the ERV 200. The intake 210 allows external/outdoor air to enter the ERV 200. Within the housing 125 may be an inlet 130 (for allowing air from the external ambient to enter the MPD 100 and then ERV 200), at least one filter 110, a first gap 140*a* containing a first sensor 115*a*, a heating coil 105, a second gap 140*b* containing a second sensor 115*b*, and an outlet 135 to direct the air from the MPD 100 to the ERV 200. The MPD 100 may also include a third sensor 115*c* and a fourth sensor 115*d* located within the building return 220 duct of the ERV 200, and a controller 120 which may be connected to the sensors 115*a*, 115*b*, 115*c*, and 115*d*. The controller 120 may also be connected to the heating coil 105 and capable of activating, deactivating, and controlling the heating level of the heating coil 105.

The ERV 200, as a standard system includes a heat recovery ventilator (HRV) 205, intake 210, exhaust 215, building return 220 and building supply 225 ducts. The HRV 205 is a heat exchanger, capable of heating the intake 210 and recovering heat from the building supply 225. Dashed lines in FIG. 1 show the path of air flow through HRV 205, whereby heat is recovered from the building return 220 to the intake 210/building supply 225 air prior to being released to the external ambient as exhaust 215.

Figure 2A:
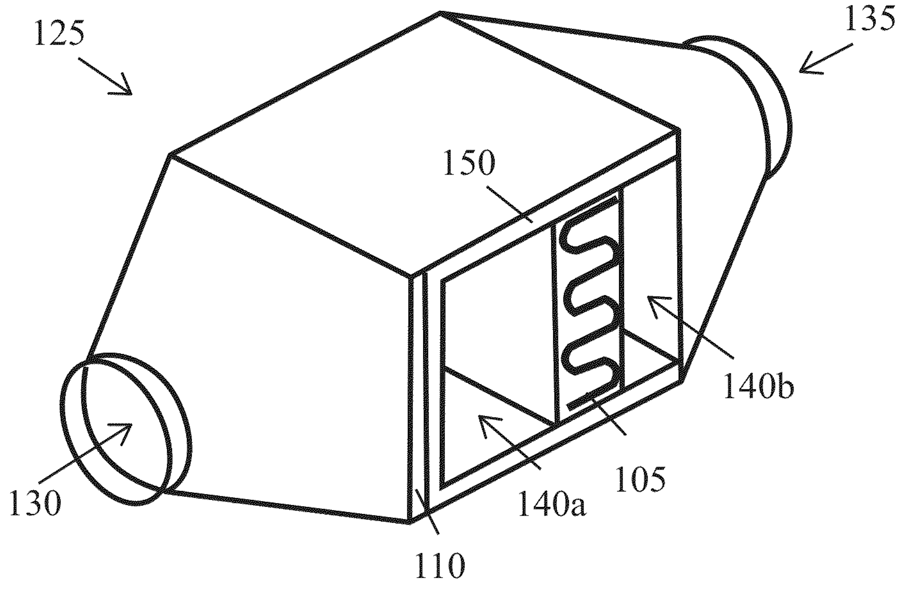
FIG. 2A illustrates an isometric view and FIG. 2B illustrates a section view of the housing within the MPD according to some aspects of the present disclosure.
Figure 2B:
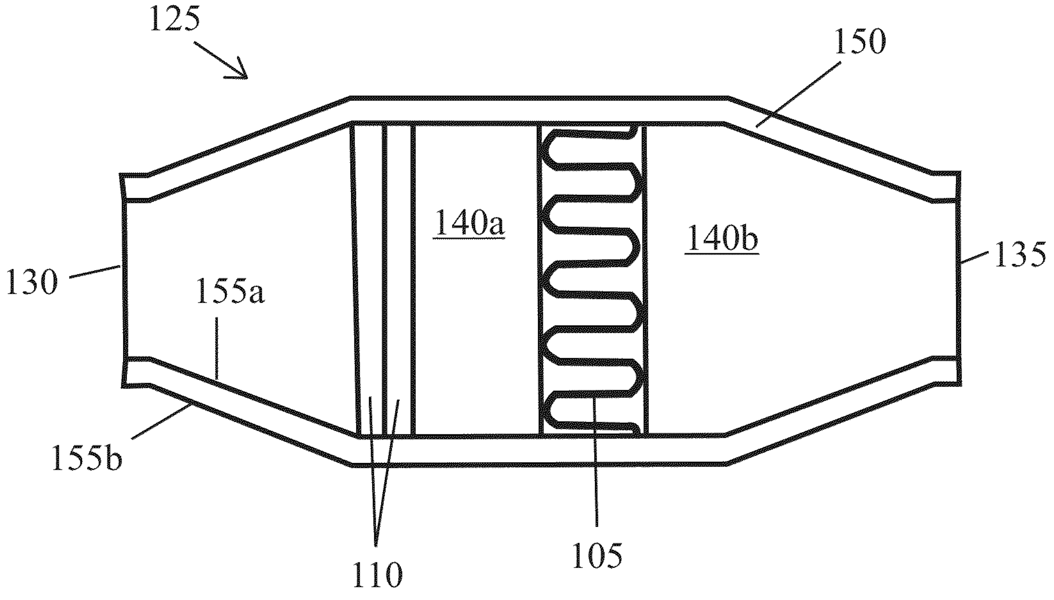

FIG. 2A illustrates an isometric view and FIG. 2B illustrates a section view of the housing 125 within the MPD 100 according to some aspects of the present disclosure. In some embodiments, the housing 125 may be substantially insulated. For example, in some embodiments, the housing 125 may be made of a metal such as steel or aluminum and substantially surrounded by an insulative material such as fiberglass, glass wool, or steel wool. In some embodiments, the housing 125 may include an inner (i.e., first) metal skin 155*a* and an outer (i.e., second) metal skin 155*b* sandwiching an insulative material 150 between them. The inner metal skins 155*a* may be a galvanized sheet metal (i.e., aluminum or steel) to attempt to prevent rusting and/or microbial growth within the housing 125. The outer metal skin 155*b* may be a sheet metal (i.e., aluminum or steel) treated with a powder coating finish or similar to prevent surface damage. The insulative material 150 may be at least one of fiberglass, glass wool, or steel wool.

In some embodiments, the filter 110 in the housing 125 may be a standard air duct filter. The filter 110 may be spun fiberglass, pleated paper, cloth, wire mesh, polyester mesh, or another material within a solid frame. In some embodiments, there may be one, two, three, four, five, six, seven, eight, nine, or ten filters 110. Exemplary dimensions are 1"×10"×10" (if multiple filters 110 are used) or 2"×10"×10" (if a single filter 110 is used), although other dimensions for the filter 110 may be used. The filter 110 may be substantially the same size as the cross section of the housing 125 to as to clarify substantially all of the air passing through the housing 125 (that is, substantially all of the air passing through the housing 125 will be contacted by the filter 110). The filter 110 may provide initial protection for the heating coil 105 from debris in the external air. The filter 110 may also supplement the filters in the ERV 200, potentially resulting in better indoor air quality.

In some embodiments, the MPD 100 may include a heating coil 105 that is an electric resistance heating coil. In some embodiments, the MPD 100 may include a heating coil 105 that is a hydronic heating coil. In some embodiments, the MPD 100 may include a heating coil 105 that contains a synthetic refrigerant. In some embodiments, the heating coil 105 may be rated for outdoor air exposure with an appropriate anti-freeze fluid. The heating coil 105 may have two primary modes: an "on" mode where the heating coil 105 is emitting heat and an "off" mode where the heating coil 105 is not emitting heat. The heating coil 105 may also be capable of emitting various levels of heating. The controller 120 may be capable of selecting a desired heating level of the heating coil 105. That is, the mode (i.e., performance level or heat emission level) of the heating coil 105 may be controlled by the controller 120.

In some embodiments, a first sensor 115*a* (shown in FIG. 1, not shown in FIGS. 2A-B) may be positioned in a first gap 140*a* and a second sensor 115*b* (shown in FIG. 1, not shown in FIGS. 2A-B) may be positioned in a second gap 140*b*. The first gap 140*a* may be on the first side of the heating coil 105 (i.e., on the side of the heating coil 105 closest to the inlet 130 or ambient/outdoors). The second gap 140*b* may be on the second side of the heating coil 105 (i.e., on the side of the heating coil 105 closest to the outlet 135 or the intake 210 duct).

In some embodiments, the first sensor 115*a*, the second sensor 115*b*, and the fourth sensor 115*d* may be temperature sensors (i.e., thermometers) capable of measuring the temperature of the air in the housing 125 or the building return 220 duct (based on where the sensor 115) is located. The sensors 115 which measure temperature may be capable of measuring temperatures down to approximately −40 °C with an accuracy of approximately 3 °C.

The third sensor 115*c* may be a relative humidity monitor (i.e., a humidity monitor) capable of determining the humidity in the building return 220 air. In some embodiments, all sensors 115 may be temperature sensors and relative humidity sensors. In some embodiments, the number of sensors 115 may be greater or less than the example shown in FIG. 1. That is, in some embodiments, there may be less than four sensors 115 or more than four sensors 115. In some embodiments, a sensor 115 may be present in the exhaust 215 duct. The sensors 115 may be connected to the controller 120 so that the controller 120 receives data from each individual sensor 115.

Figure 3:
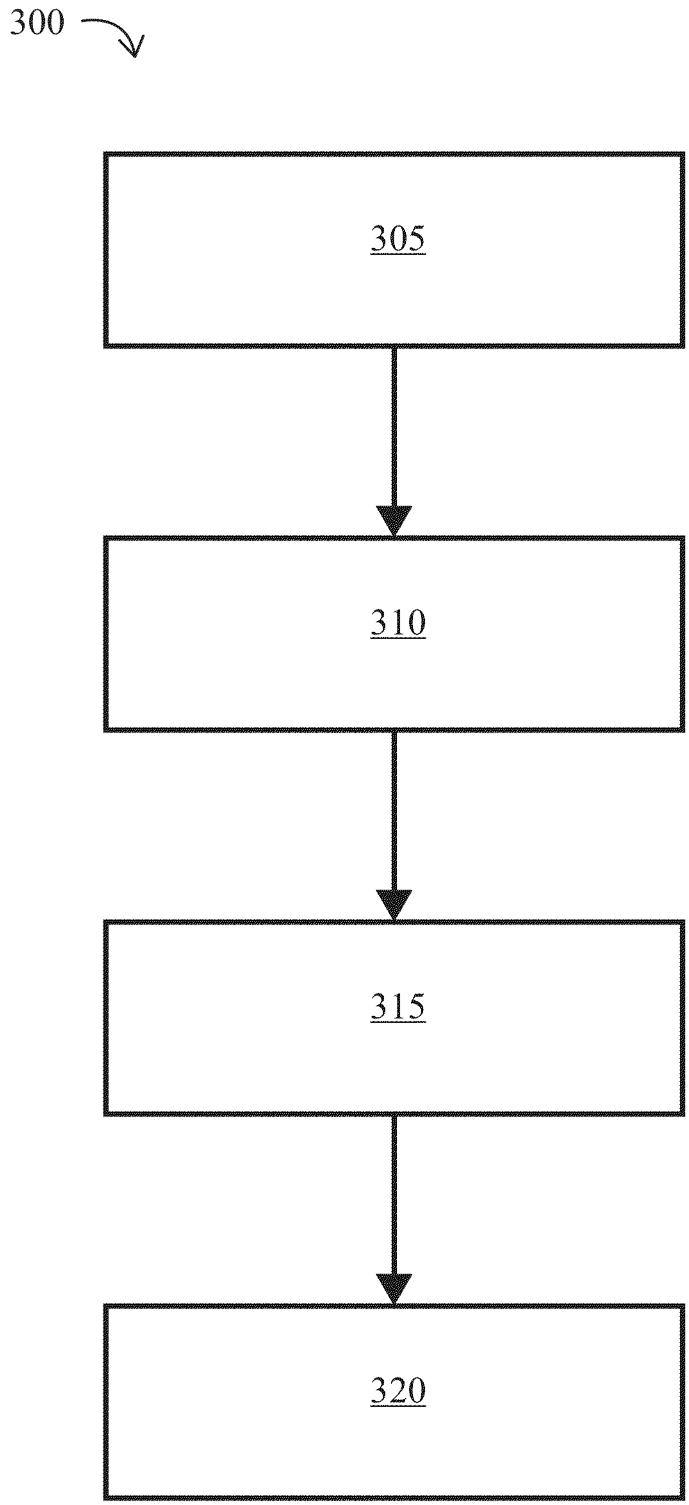
FIG. 3 illustrates a method of operating a MPD, according to some aspects of the present disclosure.

FIG. 3 illustrates method 300 of operating a MPD 100, according to some aspects of the present disclosure. The method 300 includes calculating 305, measuring 310, determining 315, and activating 320.

In some embodiments, the method 300 includes calculating 305 using a controller 120, an estimated dewpoint of the building return 220 air. In some embodiments, the third sensor 115*c* and fourth sensor 115*d* in the building return 220 may take measurements (i.e., measuring 310) for the temperature and relative humidity on the building return 220 air. The controller 120 may calculate 305 the dewpoint for the building return 220 air based on the temperature and relative humidity data from the sensors (115*c* and 115*d*) in the building return 220 duct.

As used herein, "dewpoint" refers to the temperature that a given air needs to be cooled to at a substantially constant pressure in order to become saturated with water vapor (i.e., to achieve a relative humidity of approximately 100%). Dewpoint ($T_d$) may be calculated for an air a given temperature (T) (in °C) if the relative humidity (RH) (in %) of the air is also known by the following equation:

$$T_d = T - \left(\frac{100 - RH}{5}\right) \quad \text{Eqn. 1}$$

In temperatures substantially greater than freezing, at the dewpoint water will condense on surfaces. When the temperature is approximately at or below freezing (such as in cold climates), the dewpoint is substantially equivalent to the frost point, meaning that at the dewpoint frost will form on surfaces. When the building return 220 is at a temperature approximately at or below the estimated dewpoint as calculated 305 by the controller 120, frost may develop in the HRV 205 and other components of the ERV 200, which may require the entire ERV 200 to shut down to defrost.

In some embodiments, the method 300 includes measuring 310, using a sensor 115, the temperature of the intake 210 air. This measuring 310 may be done using the first sensor 115*a* in the first gap 140*a* of the housing 125. The air in the housing 125 in the first gap may be considered outdoor/external air or ambient air. That is, the air temperature taken by the first sensor 115*a* may be substantially equivalent to the outdoor air temperature. The temperature measured 310 by the sensor 115 may be communicated to the controller 120.

In some embodiments, the method 300 includes measuring 310, using a sensor 115, the temperature of the building return 220 air. The temperature measured 310 by the sensor 115 may be communicated to the controller 120.

In some embodiments, the method 300 includes determining 315, using the controller 120, whether the temperature of the building return 220 air is approximately equivalent to or less than the estimated dewpoint (from the calculating 305). The determining 315 may also include determining whether the building return 220 when in the HRV 205 and exchanging heat with the intake 210 air (i.e., a heat exchanger building return air temperature) will drop approximately below the estimated dewpoint. When the intake 210 air temperature is measured 310 as being below freezing (i.e., below approximately 32 °C), the heat exchanger building return air temperature will be determined 315 to be below the estimated dewpoint.

In some embodiments, the method 300 includes determining 315, using the controller 120, a target temperature of the intake 210 air to prevent the building return 220 temperature and the heat exchanger building return air temperature from being approximately below the estimated dewpoint. The target temperature of the intake 210 air may be the temperature the heating coil 105 is intended to heat the intake 210 air to in order to prevent frost build up in the ERV 200.

In some embodiments, the method 300 includes activating 320 the heating coil 105 if the building return 220 air temperature or the heat exchanger building return 220 air temperature are determined 315 to be approximately below the dewpoint. That is, when the temperature of the building return 220 air or the heat exchanger building return air temperature is approximately at or below the calculated dewpoint temperature, the controller 120 may turn on or activate 320 the heating coil 105 positioned within the housing 125.

In some embodiments, the method 300 includes deactivating (not shown in FIG. 3) the heating coil 105 if the heating coil 105 if the building return 220 air temperature or the heat exchanger building return 220 air temperature are determined 315 to be approximately above the dewpoint. In some embodiments, the heating coil 105 may also be deactivated if the first temperature as measured by the first sensor 115*a* is less than or equal to approximately 4 °C. These deactivations may decrease wasted energy from utilizing the heating coil 105 when it is unnecessary or an excessive use of energy.

In some embodiments, the method 300 includes measuring 310 the temperature of incoming air (i.e., the air which will become the intake 210 air) in the housing 125 both prior to (i.e., by the first sensor 115*a* in gap 140*a*) and after (i.e., by the second sensor 115*b* in gap 140*b*) being heated by the heating coil 105 (i.e., after the activating 320). The temperatures as measured by the sensors 115 may be communicated to the controller 120.

In some embodiments, the temperature as measured by the second sensor 115 (i.e., for air that has been heated by the heating coil 105) may be compared the target temperature of the intake 210 air as determined 315 by the controller 120. Based on this comparison, the controller 120 may modulate the output of the heating coil 105 to only heat the intake 210 to the target temperature (i.e., the temperature substantially sufficient to keep the building return 220 air or the heat exchanger building return air approximately above the estimated dewpoint). That is, the heating coil 105 may be activated 320 to run at the minimum heat level needed to prevent frost in the ERV 200 (that is, the minimum heat level needed to keep the temperature of the building return 220 air in the heat recovery ventilator 205 approximately at or above the calculated dewpoint). In this way, the MPD 100 is capable of providing a proportional response to the need for frost prevention, but only expending as much energy as is needed to keep the building return 220 air or the heat exchanger building return air approximately above the estimated dewpoint.

In some embodiments, the operation of the MPD 100 may be controlled using a controller 120 (i.e., a processor), which may be capable of receiving data, making calculations, and providing instructions to the heating coil 105. The controller 120 may utilize hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to 1) tangible computer-readable storage media, which is non-transitory or 2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media may comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" 120 as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

As used herein, a "cold climate" is defined as a region with more than approximately 9,000 heating degree days (on a 65 °F basis). Heating degree days are a measure of how cold the temperature was on a given day during a period of days. The MPD 100 of the present disclosure could be used in climates which are not typically considered "cold climates" as well as "cold climates." The location/climate for the use of the MPD 100 as described herein is not intended to be limited to any one geographic area, climate, or altitude.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method comprising:

calculating, using a controller, an estimated dewpoint of a building return air;

measuring, using a first sensor, a first temperature of an intake air;

measuring, using a second sensor, a second temperature of the building return air;

determining, using the controller, whether the second temperature is greater than or less than the estimated dewpoint;

activating, using the controller, the heating coil when the second temperature is determined to be less than the estimated dewpoint;

measuring, using a third sensor, a third temperature of the intake air;

determining, using the controller, a target temperature for the intake air; and adjusting the amount of heat emitted from the heating coil until the third temperature is approximately equivalent to the target temperature; wherein:

the heating coil has a first side and a second side and is in thermal communication with the intake air, the first sensor is located on the first side, the third sensor is located on the second side, and the activating comprises emitting an amount of heat from the heating coil.

2. The method of claim 1, further comprising:

determining, using the controller, whether a fourth temperature of the building return air in a heating recovery ventilator is greater than or less than the estimated dewpoint; and activating, using the controller, the heating coil when the fourth temperature is determined to be less than the estimated dewpoint; wherein:

the building return air is configured to exchange heat with the intake air in the heating recovery ventilator.

3. The method of claim 2, further comprising:

deactivating, using the controller, the heating coil when the fourth temperature is determined to be greater than the estimated dewpoint.

4. The method of claim 1, further comprising:

deactivating, using the controller, the heating coil when the second temperature is determined to be greater than the estimated dewpoint.

5. The method of claim 1, wherein:

the calculating comprises:

taking a measurement of the building return air;

communicating the measurement to the controller; and determining, based on the measurement, the estimated dewpoint; wherein:

the measurement comprises at least one of the temperature and the relative humidity of the building return air.

6. The method of claim 1, wherein:

the measuring comprises communicating the first temperature and the second temperature to the controller.

7. The method of claim 1, wherein:

the heating coil is positioned within a housing.

8. The method of claim 7, wherein:

a filter is positioned within the housing on the first side of the heating coil.

9. The method of claim 1, wherein:

the heating coil comprises an electric resistance coil or a hydronic heating coil.

10. A device comprising:

a housing connected to an intake;

a heating coil positioned within the housing and having a first side and a second side;

a first sensor positioned within the housing on the first side of the heating coil;

a second sensor positioned within a building return;

a third sensor positioned within the housing on the second side of the heating coil; and a controller; wherein:

the first sensor is configured to measure a first temperature of an intake air and to communicate the first temperature to the controller, the second sensor is configured to measure a second temperature of a building return air and to communicate the second temperature to the controller, the third sensor is configured to measure a third temperature of the intake air and to communicate the third temperature to the controller, the controller is configured to calculate an estimated dewpoint of the building return air, the heating coil is configured to be activated when the second temperature is less than the estimated dewpoint, the controller is configured to determine a target intake air temperature which would correspond to a building return air temperature greater than the estimated dewpoint, and the controller is configured to modulate the heating coil so the third temperature is approximately equivalent to the target intake air temperature.

11. The device of claim 10, further comprising:

a filter positioned within the housing on the first side of the heating coil.

12. The device of claim 10, wherein:

the controller is configured to deactivate the heating coil when the second temperature is greater than the estimated dewpoint.

13. The device of claim 10, wherein:

the housing is substantially insulated.

14. The device of claim 10, wherein:

the heating coil comprises an electric resistance coil or a hydronic heating coil.

15. The device of claim 10, wherein:

the building return air is configured to exchange heat with the intake air in a heating recovery ventilator, the controller is configured to determine whether a fourth temperature of the building return air in the heating recovery ventilator is greater than or less than the estimated dewpoint, and the controller is configured to activate the heating coil when the fourth temperature is less than the estimated dewpoint.

16. The device of claim 15, wherein:

the heating recovery ventilator is a part of an energy recovery ventilation (ERV) system.

* * * * *